Dec. 27, 1949    J. N. DE GRUCHY    2,492,556
RECTIFIER BRIDGE TYPE WATTMETER
Filed Sept. 9, 1948

JOHN NORMAN de GRUCHY,
INVENTOR
BY Henninger and Pillow
ATTORNEYS

Patented Dec. 27, 1949

2,492,556

UNITED STATES PATENT OFFICE 2,492,556

RECTIFIER BRIDGE TYPE WATTMETER

John Norman de Gruchy, Rickmansworth, England, assignor to Everett, Edgcumbe and Company Limited, London, England, a British company Application September 9, 1948, Serial No. 48,353
In Great Britain August 7, 1947

5 Claims. (Cl. 171—95)

This invention relates to electrical measuring instruments, for example wattmeters or VAR meters and has for an object the provision of a robust measuring apparatus comprising a permanent magnet moving coil instrument with which the power taken by any apparatus of low consumption may be measured without appreciable correction having to be made for the power consumed in the measuring device itself.

The use of instruments of the dynamometer or induction type for the aforesaid measurement of power is well-known, but such instruments are liable to consume an excessive amount of power, unless the control is made so weak as to render the instruments unsuitable for use in a workshop or on a general test bench.

Hitherto it has been proposed to arrange in conjunction with a permanent magnet instrument a network of rectifiers and resistance such as to enable a reading to be obtained which is proportional to the product of the current in a circuit and the cosine of the phase angle between that current and the voltage producing it ($I \cos \phi$). Such an arrangement, however, cannot be applied to the measurment of power ($EI \cos \phi$) since the reading would be incorrect unless the circuit voltage corresponded to that at which the instrument was calibrated.

It is, therefore, a special object of the present invention to provide a simple measuring instrument, particularly adapted for the measurement of A. C. power, consisting of: a balanced rectifier Wheatstone bridge circuit whose output is proportional to the product of the current to be measured and its phase angle relative to the line voltage to be measured, a meter connected to the bridge output, and a variable resistance shunting said meter, which resistance is manually or automatically varied in proportion to line voltage variations, so that the meter reading is also proportional to the line voltage.

Thus, the variable resistance may be adjusted manually to a scale of line volts marked on a dial attached to the setting knob or member, or it may be arranged so as to be controlled automatically by the line voltage, by making the resistance thermally variable, or non-linear.

The accompanying drawings diagrammatically illustrate three methods of carrying this invention into effect.

Figure 1:
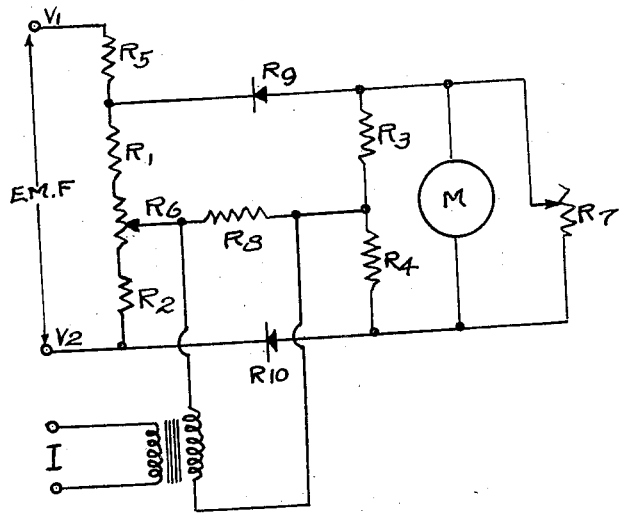

Referring first to Fig. 1, M represents a moving coil permanent magnet instrument connected to a potential network consisting of resistors R1, R2, R5 and R6. The instrument is also connected to a bridge circuit consisting of resistors R1, R2, R3, R4 and rectifiers R9 and R10. This bridge circuit can be taken as two separate circuits in which half of resistor R6 is in each circuits in which half of resistor R8 is common to both circuit and a resistor R8 is connected across the terminals of the secondary winding of a current transformer I, the primary of which is connected to an A. C. source of supply.

The operation of the circuit is as follows: with no current flowing in the primary of the current transformer I, there will be no potential developed across R8 from this source.

Now in each half cycle of the applied E. M. F. one half of the bridge network will pass current so that a potential is set up across R3 or R4. The direction of current flow is controlled by the rectifiers R9 and R10 and is such that the pulses appearing across R3 and R4 in successive half cycles are equal and opposite.

The permanent magnet moving coil indicator M serves to integrate these pulses and under the conditions set out above, the integrated output will be zero.

When current flows in the primary of the current transformer I, a voltage appears across R8, which assists any one conducting half cycle and opposes in the succeeding half cycle.

As a result of the potential across one of the output resistors R3 and R4 will increase, whilst the potential across the other will decrease, and this difference potential will be indicated by the permanent magnet moving coil indicator M.

It is a feature of this circuit that the output of the permanent magnet moving coil indicator M is proportional to the voltage appearing across R8 and to the phase angle of that voltage relative to the phase angle of the applied E. M. F.

When certain conditions are fulfilled it is largely independent of variations of E. M. F. The D. C. output therefore in the cases quoted will be proportional to $I \cos \phi$.

If now a variable resistance R7 is shunted across the permanent magnet moving coil indicator, a deflection of the indicator can be varied by altering the value of R7, which may carry a scale of voltage at which the indicator gives a true reading of $EI \cos \phi$.

Figure 2:
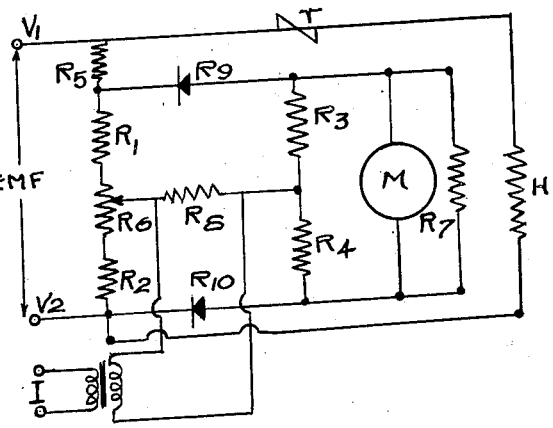

In the alternative form of the invention shown in Fig. 2, R7 is shown as a fixed resistance of a high temperature co-efficient material which is in thermal relation with a heater H which is supplied via a suitable resistance r from the voltage terminals.

Variations of the voltage will cause changes of heater current, and therefore of temperature and hence resistance R7.

Figure 3:
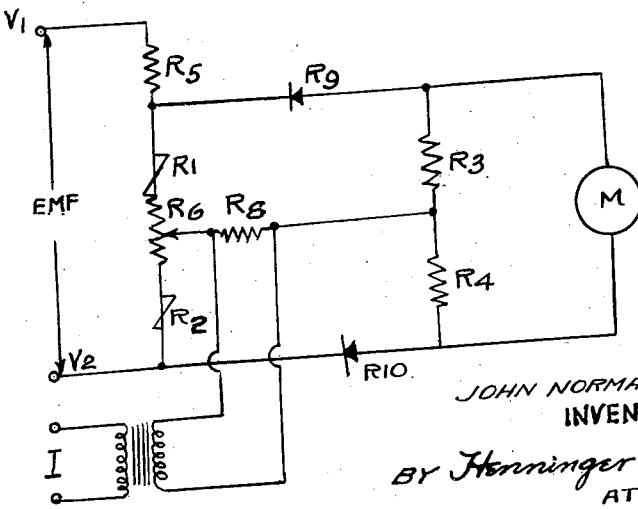

A further method of attaining our object is shown at Fig. 3 where the resistors R1 and R2 are non-linear and having a characteristic which causes their effective resistance to decrease when the current passing through them increases.

Now if any variation occurs in the value of the applied E. M. F. to the network R5, R6, R1 and R2, the value of R1 and R2 would be altered, and this change of resistance will give rise to a change in the current flowing in the bridge circuit as a result of the voltage applied across R8. By suitably proportioning R1, R2, R6, R9, R10, R3 and R4, this change of resistance can be made to vary the output component across R3 and R4 in the same proportions as the variations applied to the input voltage terminals.

What I claim is:

1. An electrical measuring instrument comprising in combination: a first source of voltage; a Wheatstone bridge connected across said source; a first rectifier in a first arm of said bridge; a second rectifier in a second arm of said bridge; said first and second arms being connected in series circuit relation, said rectifiers being in phase opposition; a meter connected in parallel circuit relation with said series circuit; a first resistance connected between the junction of said first and second arms and the junction of the third and fourth arms of said bridge; a second source of voltage in parallel circuit relation with said first resistance, said second voltage source being proportional to the current to be measured; and a variable resistance shunting said meter, whereby the D. C. output of the bridge through said meter is proportional to said variable resistance and to the product of the said current and its phase angle relative to said first source of voltage.

2. An electrical measuring instrument comprising in combination: a first source of voltage; a Wheatstone bridge connected across said source; a first rectifier in a first arm of said bridge; a second rectifier in a second arm of said bridge; said first and second arms being connected in series circuit relation, said rectifiers being in phase opposition; a meter connected in parallel circuit relation with said series circuit; a first resistance connected between the junction of said first and second arms and the junction of the third and fourth arms of said bridge; a second source of voltage in parallel circuit relation with said first resistance, said second voltage source being proportional to the current to be measured; a variable resistance shunting said meter; and means to automatically vary said variable resistance in response to variations in line voltage, whereby the D. C. output of the bridge through said meter is proportional to said variable resistance and to the product of the said current and its phase angle relative to said first source of voltage.

3. An electrical measuring instrument comprising in combination: a first source of voltage; a Wheatstone bridge connected across said source; a first rectifier in a first arm of said bridge; a second rectifier in a second arm of said bridge; said first and second arms being connected in series circuit relation, said rectifiers being in phase opposition; a meter connected in parallel circuit relation with said series circuit; a first resistance connected between the junction of said first and second arms and the junction of the third and fourth arms of said bridge; a second source of voltage in parallel circuit relation with said first resistance, said second voltage source being proportional to the current to be measured; a variable resistance shunting said meter, said variable resistance being composed of a high temperature coefficient material; and a heater winding connected across said first source of voltage, said heater being in thermal relation with said variable resistance, whereby the D. C. bridge output to said meter is proportional to said first source of voltage, and to the product of said current and its phase angle relative to said first source of voltage.

4. An electrical measuring instrument comprising in combination: a first source of voltage; a Wheatstone bridge connected across said source; a first rectifier in a first arm of said bridge; a second rectifier in a second arm of said bridge, said first and second arms being connected in series circuit relation, and said rectifiers being connected in phase opposition; a meter connected in parallel with said series circuit and with the series circuit comprising the third and fourth arms of said bridge; a first resistance having its one side connected to the junction of said first and second arms, and its other side adjustably connected to a variable resistance in series circuit relation with, and between, said third and fourth bridge arms; a second source of voltage in parallel circuit relation with said first resistance, and a non-linear resistance in said bridge, whereby the input to said meter is proportional to said first source of voltage, and to the product of said current and its phase angle relative to said first source of voltage.

5. An electrical measuring instrument comprising in combination: a first source of voltage; a Wheatstone bridge connected across said source; a first rectifier in a first arm of said bridge; a second rectifier in a second arm of said bridge, said first and second arms being connected in series circuit relation, and said rectifiers being connected in phase opposition; a meter connected in parallel with said series circuit and with the series circuit comprising the third and fourth arms of said bridge; a first resistance having its one side connected to the junction of said first and second arms, and its other side adjustably connected to a variable resistance in series circuit relation with, and between, said third and fourth bridge arms; a second source of voltage in parallel circuit relation with said first resistance, and separate non-linear resistances in each of said third and fourth arms, whereby the input to said meter is proportional to said first source of voltage, and to the product of said current and its phase angle relative to said first source of voltage.

JOHN NORMAN DE GRUCHY.

No references cited.